(12) United States Patent
Akiba (10) Patent No.: US 6,765,859 B2
(45) Date of Patent: Jul. 20, 2004

(54) RECORD AND READ APPARATUS

(75) Inventor: Takao Akiba, Saitama (JP)

(73) Assignee: Teac Corporation, Tokyo (JP)

( * ) Notice: Subject to any disclaimer, the term of this patent is extended or adjusted under 35 U.S.C. 154(b) by 42 days.

(21) Appl. No.: 10/166,983

(22) Filed: Jun. 10, 2002

(65) Prior Publication Data

US 2002/0186646 A1 Dec. 12, 2002

(30) Foreign Application Priority Data

Jun. 11, 2001 (JP) .................................. 2001-175798
Jun. 11, 2001 (JP) .................................. 2001-175799

(51) Int. Cl.[7] .............................................. G11B 21/24
(52) U.S. Cl. ................................................... 369/249
(58) Field of Search ............................... 369/249, 244, 369/219, 215, 75.2; 360/106, 109

(56) References Cited

U.S. PATENT DOCUMENTS

| | | | | |
|---|---|---|---|---|
| 5,375,115 A | * | 12/1994 | Shimegi et al. ............. | 369/244 |
| 5,933,406 A | * | 8/1999 | Ikegame ..................... | 369/247 |
| 6,178,154 B1 | * | 1/2001 | Inata et al. ................. | 369/219 |
| 6,285,649 B1 | * | 9/2001 | Bessho et al. .............. | 369/219 |
| 6,356,525 B1 | * | 3/2002 | Ikedo et al. ................ | 369/219 |
| 6,385,160 B1 | * | 5/2002 | Jeon .......................... | 369/219 |
| 6,483,798 B1 | * | 11/2002 | Wu ............................ | 369/219 |
| 6,567,362 B1 | * | 5/2003 | Kagaya et al. ............. | 369/77.1 |

FOREIGN PATENT DOCUMENTS

JP          11-203801          7/1999

* cited by examiner

Primary Examiner—A. J. Heinz
Assistant Examiner—Angel Castro
(74) Attorney, Agent, or Firm—Anderson Kill & Olick, P.C.; Eugene Lieberstein; Michael N. Meller

(57) ABSTRACT

A record and read apparatus, includes a head by which information is read from or written to a recording medium, a guide shaft guiding movements of the head, a base part supporting the guide shaft, a pressing member pressing the guide shaft, and a support member adjustably supporting an end part of the guide shaft against a pressing force of the pressing member so that the end part of the guide shaft has a designated height from the base part, wherein the guide shaft has a notch part and the pressing member comes in contact with the notch part so that the height of the guide shaft from the base part is adjustable.

4 Claims, 8 Drawing Sheets

RECORD AND READ APPARATUS

BACKGROUND OF THE INVENTION

1. Field of the Invention

The present invention generally relates to record and read apparatuses, and more particularly, to a record and read apparatus having a structure in which the height of the head by which information is read from or written to a recording medium can be adjusted.

2. Description of the Related Art

For example, in a record and read apparatus in which a disk type recording medium is installed, an optical head comprising a laser type optical pick up is moved in a radial direction of the disk so that information is read from or written to the recording medium. In this kind of record and read apparatus, after the tray on which the disk type recording medium is mounted is installed in the record and read apparatus, the disk type recording medium is clamped by a turn table. And then, the optical head is guided by a guide shaft and performs a seek operation in the radial direction of the disk.

In this kind of record and read apparatus, it is required that information (pit pattern) recorded in the disk type recording medium with high density be read out precisely. Hence, it is necessary to adjust the relative angle between the optical head and the disk type recording medium so that the distance and the inclination between the position for the seek operation of the optical head against the disk type recording medium and the disk mounted on the turn table are constant.

That is, in an assembly line of the record and read apparatus such as a disk apparatus, after assembly of the turn table and the optical head is completed, a light reflected from a standard disk for position adjustment is detected by the optical head in a state where the standard disk for position adjustment is clamped at the turn table. At that time, the install angle and the distance (height) of the optical head and the inclination against the standard disk are adjusted so that the angle of the laser light is a designated value by measuring the gap of the angle of the light reflected from the standard disk detected by the optical head with a measuring tool (auto collimator).

The height of the optical head against the standard disk is supported at the designated position by adjusting the height of the guide shaft guiding the optical head.

For example, Japanese Laid-Open Patent Application No. 11-203801 discloses a conventional art record and read apparatus having a mechanism for adjusting the height of the guide shaft. In the above described conventional art record and read apparatus, a coil spring is disposed between the guide shaft and a chassis. An adjustment screw is driven into the chassis and a head part of the adjustment screw comes in contact with an upper part of the guide shaft so that the height of the guide shaft can be adjusted.

However, according to the conventional art record and read apparatus disclosed in the above Japanese Laid-Open Patent Application, the adjustment screw comes in contact with an outer circumference of the guide shaft made of around stock in a side direction. The coil spring disposed between the guide shaft and the chassis is compressed by pressing the outer circumference of the guide shaft from an upper side with the head part of the adjustment screw. The amount of compression of the coil spring is changed based on the driving amount of the adjustment screw screwed into the guide shaft, so that the support height of the guide shaft against the chassis is adjusted.

Therefore, the minimum adjustable height of the guide shaft is too high. Hence, it is not possible to make the record and read apparatus thin.

Furthermore, the structure of the guide shaft adjust mechanism is large so that the space for disposing the adjust mechanism is large. Hence, it is not possible to make the record and read apparatus thin.

SUMMARY OF THE INVENTION

Accordingly, it is a general object of the present invention to provide a novel and useful record and read apparatus wherein one or more of the problems described above are eliminated.

Another and more specific object of the present invention is to provide a record and read apparatus, including a head by which information is read from or written to a recording medium, a guide shaft guiding movements of the head, a base part supporting the guide shaft, a pressing member pressing the guide shaft, and a support member adjustably supporting an end part of the guide shaft against a pressing force of the pressing member so that the end part of the guide shaft has a designated height from the base part, wherein the guide shaft has a notch part and the pressing member comes in contact with the notch part so that the height of the guide shaft from the base part is adjustable.

According to the above mentioned aspect of the present invention, it is possible to meet the requirement of making the record and read apparatus thin by making the minimum adjustable height of the guide shaft short.

Another object of the present invention is to provide a record and read apparatus, including a head by which information is read from or written to a recording medium, a guide shaft guiding movements of the head, a base part supporting the guide shaft, and an adjustment mechanism adjusting an end part of the guide shaft so that the end part of the guide shaft has a designated height from the base part, wherein the adjusting mechanism includes a hole part piercing the guide shaft in a direction perpendicular to an axis of the guide shaft, a screw hole part formed at the base part, an adjustment screw adjusting the height of the end part of the guide shaft by being inserted into the hole part piercing the guide shaft and being screwed into the screw hole part of the base part, and a pressing member pressing the guide shaft to a head part of the adjustment screw.

According to the above mentioned aspect of the present invention, as compared with the conventional art record and read apparatus in which the adjustment screw is screwed in the vicinity of the guide shaft so that the head part of the adjustment screw comes in contact with the outer circumference of the guide shaft, the size of the space where the record and read apparatus of the present invention is disposed can be made small. Hence, the record and read apparatus of the present invention can meet the requirement of making the size of the apparatus small.

Another object of the present invention is to provide a record and read apparatus, including a head by which information is read from or written to a recording medium, a guide shaft guiding movements of the head, a base part supporting the guide shaft, and an adjustment mechanism adjusting an end part of the guide shaft so that the end part of the guide shaft has a designated height from the base part, wherein the adjusting mechanism includes a screw hole part piercing the guide shaft in a direction perpendicular to the axis of the guide shaft, a hole part formed at the base part, an adjustment screw adjusting the height of the end part of the guide shaft by being inserted into the hole part of the base part and being screwed into the screw hole part piercing the guide shaft, and a pressing member pressing the guide shaft in a direction remote from the base part.

According to the above mentioned aspect of the present invention, as compared with the conventional art record and read apparatus in which the adjustment screw is screwed in the vicinity of the guide shaft so that the head part of the adjustment screw comes in contact with the outer circumference of the guide shaft, the size of the space where the record and read apparatus of the present invention is disposed can be made small. Hence, the record and read apparatus of the present invention can meet the requirement of making the size of the apparatus small.

The pressing member may be a plate spring formed in a body comprising by a first pressing part pressing the guide shaft in the direction remote from the base part and a second pressing part pressing an outer circumference of the guide shaft so that the guide shaft is supported at a designated position against the base part.

According to the above mentioned aspect of the present invention, it is possible to reduce the number of components for the record and read apparatus. In addition, it is possible to act on both the first pressing part and the second pressing part at same time so that efficiency of assembly work can be improved.

A concave part may be formed at a vicinity of the hole part of the base part so that a head part of the adjustment screw is inserted.

According to the above mentioned aspect of the present invention, the head-part of the adjustment screw does not project from the chassis and thereby it is possible to make the record and read apparatus thin.

Other objects, features, and advantages of the present invention will be more apparent from the following detailed description when read in conjunction with the accompanying drawings.

BRIEF DESCRIPTION OF THE DRAWINGS

FIG. 5-(A) is a plan view showing a configuration of guide shafts 25 and 26 of FIG. 1;

FIG. 5-(B) is a bottom view showing the configuration of the guide shafts 25 and 26 of FIG. 1;

FIG. 5-(c) is a view showing the configuration of the guide shafts 25 and 26 of FIG. 1 in an axis direction;

DETAILED DESCRIPTION OF THE PREFERRED EMBODIMENTS

A description will now be given, with reference to the FIGS. 1 through 10, of embodiments of the present invention.

Figure 1:
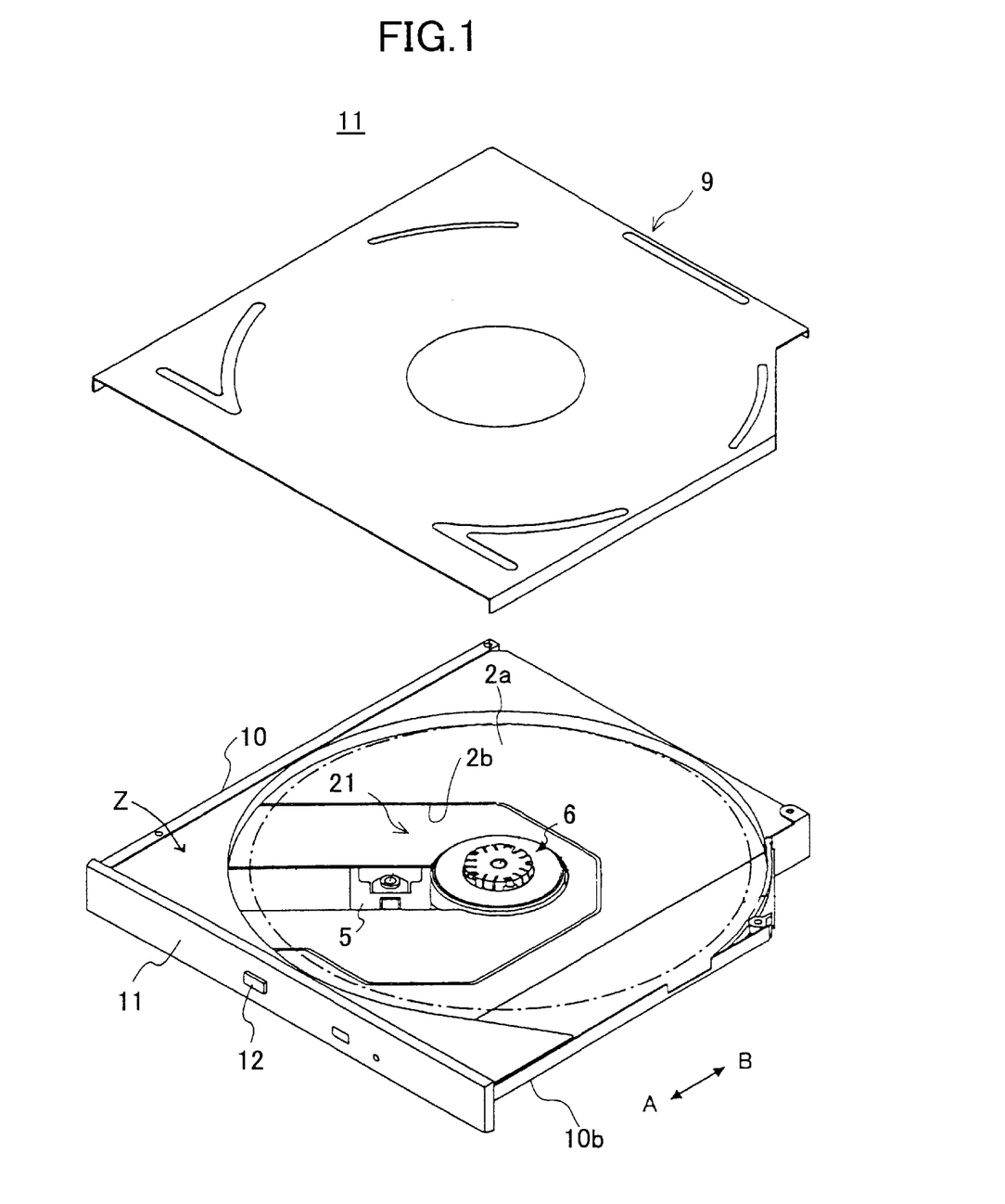
FIG. 1 is a perspective view of a CD-ROM drive apparatus as the first embodiment of a record and read apparatus of the present invention.
Figure 2:
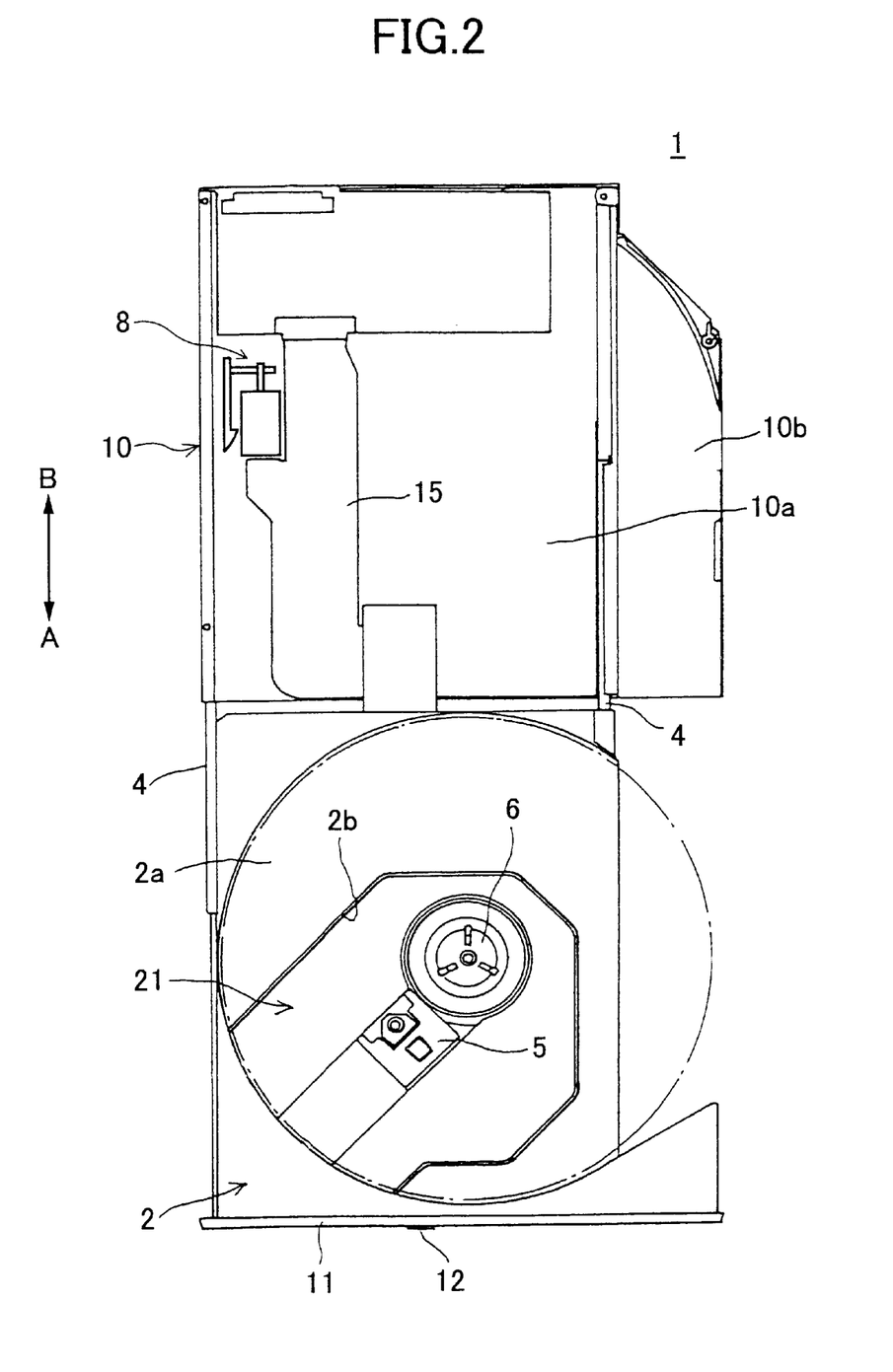
FIG. 2 is a perspective view of the CD-ROM drive apparatus shown in FIG. 1 in a state where the tray is pulled out.

FIG. 1 is a perspective view of a CD-ROM drive apparatus as a first embodiment of a record and read apparatus of the present invention. FIG. 2 is a perspective view of the CD-ROM drive apparatus shown in FIG. 1 in a state where the tray is pulled out.

Referring to FIGS. 1 and 2, a CD-ROM drive apparatus 1 as a record and read apparatus (hereinafter "apparatus 1") is built in a housing of a notebook type personal computer, namely a built-in type apparatus.

The apparatus 1 includes a tray 2, a tray sliding mechanism 4, an optical head part 5, a turn table 6, and a lock mechanism 8. A disk shown by one doted lines in FIG. 1 is accommodated on the tray 2. The tray 2 is slidably supported by the sliding mechanism 4. The optical head part 5 is provided on the tray 2. The disk such as a CD-ROM accommodated on the tray 2 is driven rotatably by the turn table 6. When the tray 2 is moved to a position where the disk is installed, the tray 2 is locked by the lock mechanism 8.

FIG. 1 shows a state where a roof plate 9 is removed and the tray 2 is moved to a disk install position inside of the apparatus 1. FIG. 2 shows a state where the roof 9 is removed and the tray 2 is moved to a disk exchange position outside of the apparatus 1.

The tray 2 is formed so that the width of the tray 2 is smaller than the outer diameter of the disk so that one part of the disk extends beyond the tray 2. The tray 2 is slid by manual operations in directions A and B so that the tray 2 can be positioned at the disk install position or the disk exchange position.

Hence, a driving mechanism such as a motor or transmission mechanism for sliding the tray 2 in the directions A and B is not provided in the apparatus 1. Accordingly, it is possible to reduce the number of components for the apparatus, so that the apparatus, can be made small and thin.

The apparatus 1 includes a chassis 10. The chassis 10 comprises a storage part 10a and a cover part 10b. The above mentioned mechanisms are stored in the storage part 10a. A part of the disk that extends beyond the tray 2 is covered by the cover part 10b in order to protect the disk. There is a space in the lower part of the cover part 10b where other apparatuses in the notebook type personal computer in which the apparatus 1 is provided are disposed, for example.

A front side bezel 11 is fixed to a front end of the tray 2 and slides in the directions A and B with the tray 2 in a body. A switch button 12 is provided in the center of the front side bezel 11 so that the lock of the lock mechanism 8 is off when the tray 2 is pulled out.

The tray 2 has a disk-facing surface 2a forming a space where the disk is received. The tray 2 also has an opening part 2b formed for the turn table and the optical head.

The width of the disk facing surface 2a is smaller than an outer diameter of the disk as the storage part 10a of the chassis 10 is covered. Two third of the disk is covered by the storage part 10a. Hence, as shown in FIG. 1, a circumferential end part at a right side of the disk extends out from the disk facing surface 2a of the tray 2 in a side direction.

When the disk is pulled out, the circumferential end part of the disk that extends out from the disk facing surface 2a can be grasped. Hence, it is not necessary to provide a concave part for grasping the disk in the tray 2. Furthermore, the entire right side of the tray 2 is a space for grasping the disk. As described above, the width of the storage part 10a of the chassis 10 is also small as corresponding to the width of the tray 2. Therefore, the cover part 10b for protecting the disk whose part extends out from the tray 2 projects from the storage part 10a in a side direction.

In FIG. 2, as shown by one doted lines, the tray 2 is formed as one part of the disk extends out of the disk-facing surface 2a of the tray 2. Therefore, there is no limitation of direction where the right side of the disk is grasped. Hence, it is possible to take out the disk from the tray 2 easily by grasping anywhere on the circumference end part extending out from the tray 2 of the disk.

Figure 3:
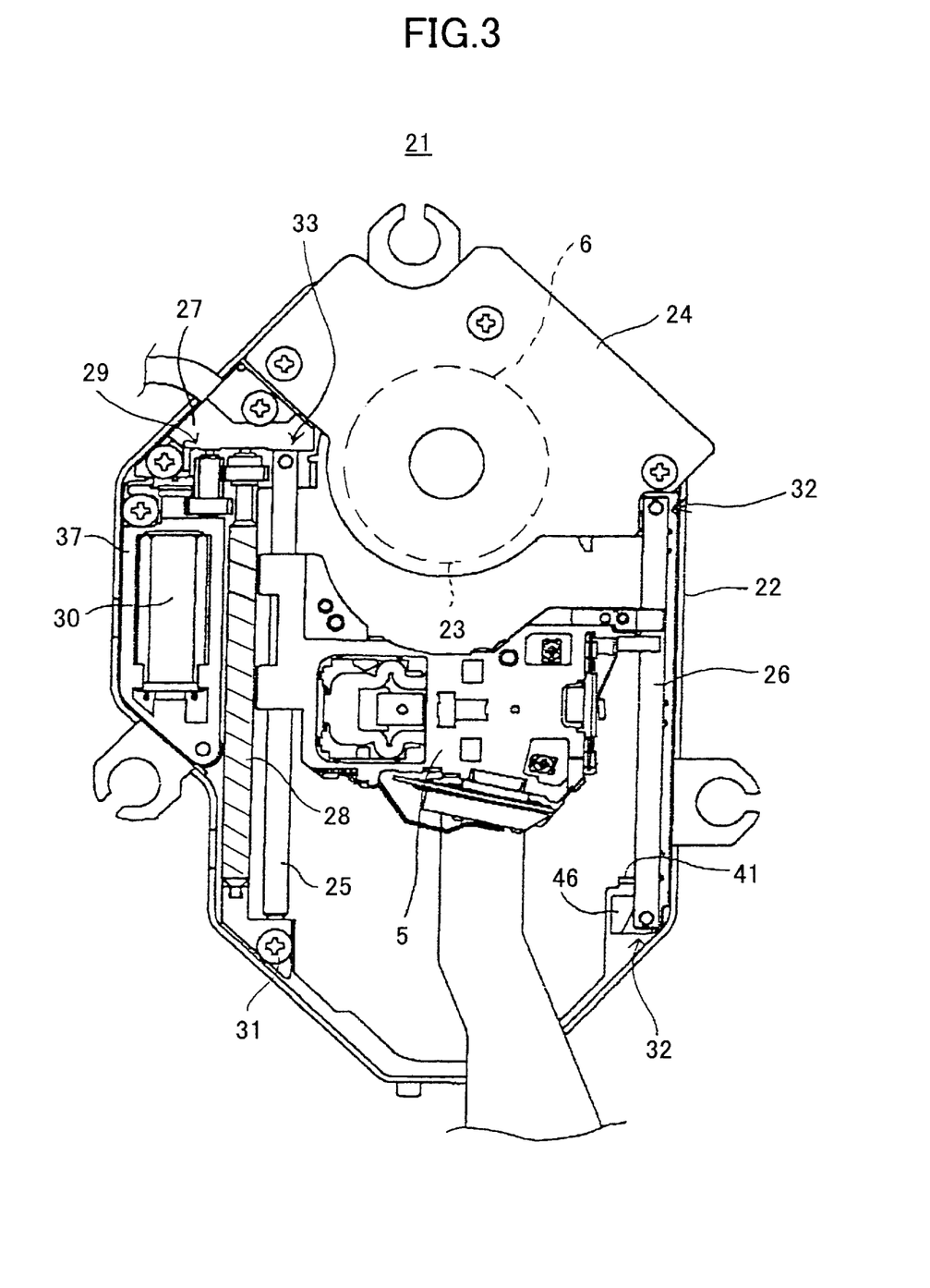
FIG. 3 is a bottom view of a record and read unit 21 of FIG. 1.

Here, the record and read unit 21 disposed on the tray 2 will be described.

FIG. 3 is a bottom view of a record and read unit 21.

Referring to FIG. 3, the record and read unit 21 includes a base part 22, a turn table 6, a disk motor 23, a motor base 24, an optical-head 5, guide shafts 25 and 26, and a driving mechanism 27. The base part 22 is fixed to an upper part of the tray 2. A disk type recording medium not shown is clamped by the turn table 6. The turn table 6 is driven by the disk motor 23. The disk motor 23 is supported by the motor base 24. Information recorded in the disk type recording medium is read out by the optical head 5. The movement of the optical head 5 is guided by a pair of guide shafts 25 and 26. The optical head 5 is moved along the guide shafts 25 and 26 by the driving mechanism 27. The guide shaft 26 is supported as being capable of having heights and inclinations of both ends of the guide shaft 26 adjusted by an adjustment mechanism 32 described later. The guide shaft 25 has one end fixed to the base part 22 as described later and another end supported as being capable of having the height adjusted. Accordingly, the pair of guide shafts 25 and 26 for guiding the optical head 5 is equipped to allow adjusting the height and the inclination at three points.

A lead screw 28 supported as extending in the same direction as the guide shaft 25, a gear mechanism 29, and an optical head driving motor 30, are equipped at the driving mechanism 27. The optical head 5 is connected to a screw part of the lead screw 28. Hence, when a rotational driving force of the optical head driving motor 30 is transmitted to the lead screw 28 by the gear mechanism 29, the optical head 5 is moved in the directions of A and B guided by the guide shafts 25 and 26 are guided.

Thus, in this embodiment, the turn table 6 driving the disk rotatably, the turntable driving motor 23 driving the turn table 6, and the optical head part 5 are disposed at the tray 2 in a body. Therefore, the precision of the relative positions of the disk and the optical head 5 are not influenced by the precision of the moving position of the tray 2. Hence, it is possible to improve a precision of the relative position of the disk for reading out.

Figure 4:
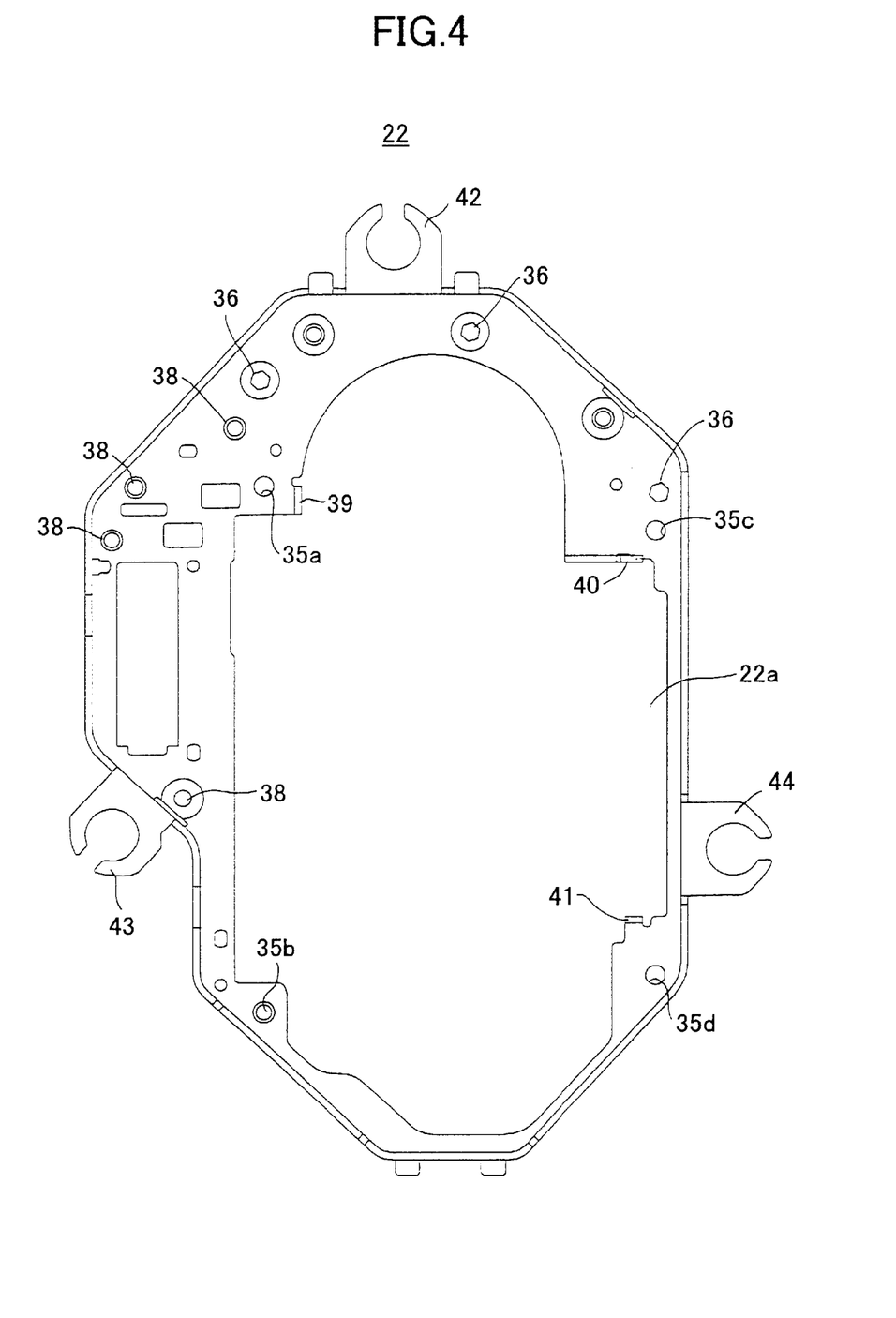
FIG. 4 is a bottom view of a base part 22 of FIG. 1.

FIG. 4 is a bottom view of the base part 22.

Referring to FIG. 4, an opening part 22a for equipping the disk motor 23, the optical head 5, and the guide shafts 25 and 26 is disposed in the center part of the base part 22. Small holes 35a through 35d, a small hole 36, and a small hole 38 are provided in the base part 22. Screws for holding both ends of the guide shafts 25 and 26 can be inserted into the small holes 35a through 35d. A screw for fixing the motor base 24 can be inserted into the small hole 36. A screw for fixing a frame 37 supporting the gear mechanism 29 and the optical head driving motor 30 can be inserted into the small hole 38.

In a side direction from the small hole 35a, a position deciding part 39 for controlling the position of the guide shaft 25 by coming in contact in a direction perpendicular to the axis of the guide shaft against the outer circumference of the guide shaft 25 is cut-formed. In a position in the vicinity of the small holes 35c and 35d, position deciding parts 40 and 41 for controlling the position of the guide shaft 26 by coming in contact in a direction perpendicular to the axis of the guide shaft 26 against the outer circumference of the guide shaft 26 are cut-formed. An internal thread is formed in the small hole 35b so that the end part of the guide shaft 25 can be fixed.

Furthermore, fix parts 42 through 44 having "C" shapes are provided at three points on an outer circumference of the base part 22, as fixed to the tray 2, through a vibration absorption dumper not shown.

Figure 5:
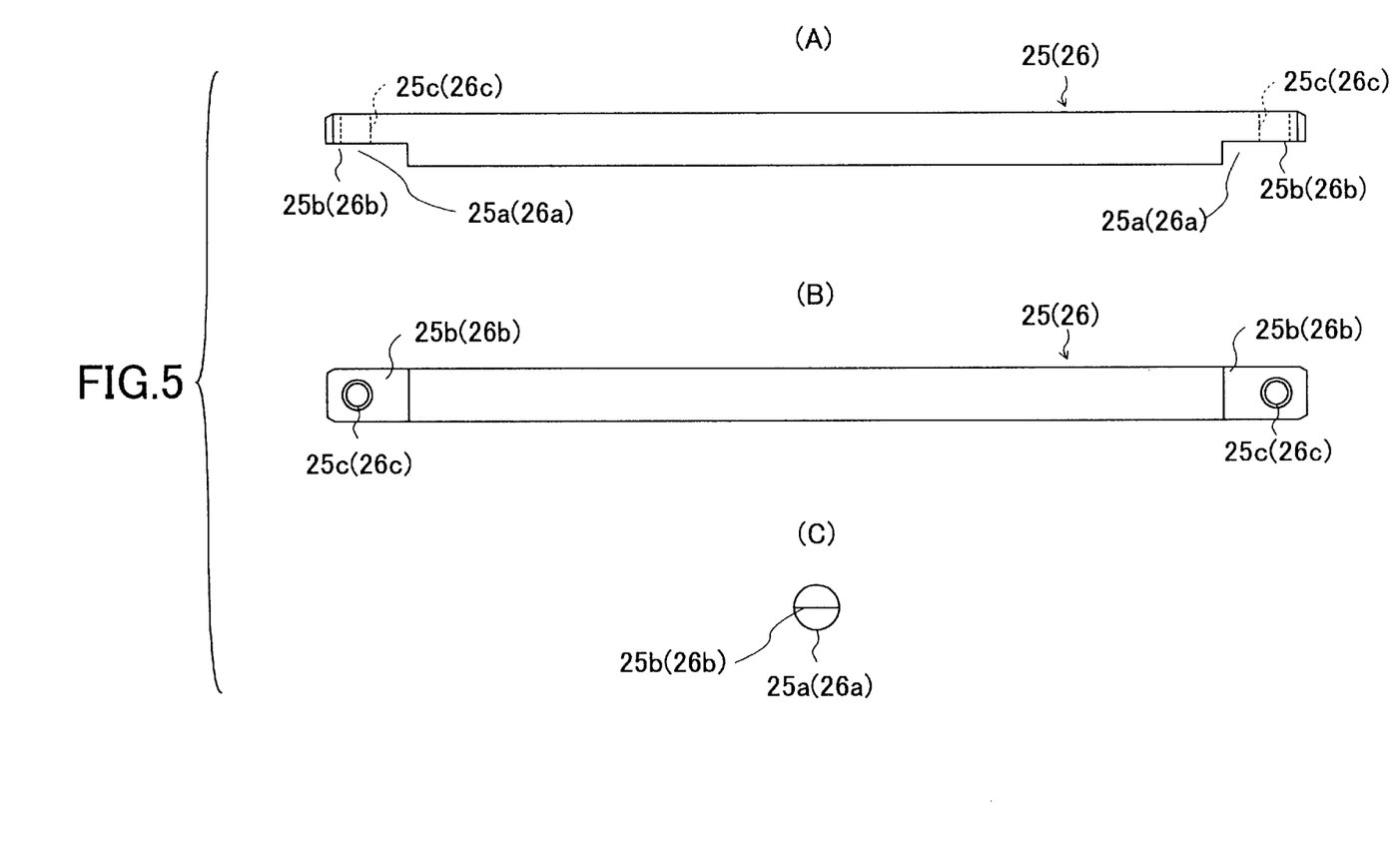

FIG. 5-(A) is a plan view showing a configuration of guide shafts 25 and 26. FIG. 5-(B) is a bottom view showing the configuration of the guide shafts 25 and 26. FIG. 5-(c) is a view showing the configuration of the guide shafts 25 and 26 in an axial direction.

Referring to FIGS. 5-(A) through 5-(C), the guide shafts 25 and 26 made of through stainless stock have both ends where notch parts 25a and 26a are provided, respectively. The notch parts 25a and 26a have semicircular, cross-sections in axial directions. Plane surfaces 25b and 26b parallel to the axis directions are formed in the notch parts 25a and 26a.

As described later, the plane surfaces 25b and 26b function as pressed surfaces pressed upward. The plane surfaces 25b and 26b are provided as positioned upward by a substantially radius distance from the outer circumference of the guide shafts 25 and 26. Thus, downward from the plane surfaces 25b and 26b are spaces where a pressing member described later is provided so that the height measurement of the base part 22 is reduced by the spaces accommodating the pressing member.

Furthermore, screw holes 25c and 26c crossing at right angles to an axial direction are inserted in the plane surfaces 25b and 26b. Adjustment screws as supporting members described later are screwed into the screw holes 25c and 26c. Height positions and inclinations of both ends of the guide shafts 25 and 26 are adjusted based on the screwing of the adjustment screws.

Figure 6:
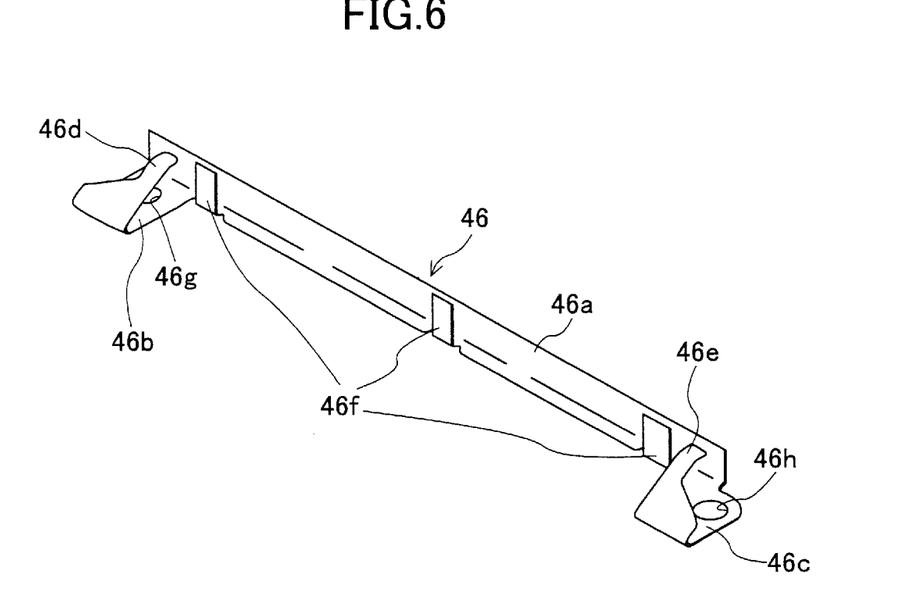
FIG. 6 is a perspective view showing a configuration of a plate spring pressing the guide shaft 26 upward.

FIG. 6 is a perspective view showing a configuration of a plate spring pressing the guide shaft 26 upwardly.

Referring to FIG. 6, a plate spring 46 includes standing part 46a, horizontal parts 46b and 46c, first pressing parts 46d and 46e, second pressing parts 46f, and install screw holes 46g and 46h. The standing part 46a extends in an axial direction of the guide shaft 26. The horizontal parts 46b and 46c project in a horizontal direction from the vicinity of both ends of the standing part 46a. The first pressing parts 46d and 46e are bent in a "V" shape so as to lean with designated angles from the horizontal parts 46b and 46c. The second pressing part 46f stand up at three locations as pushing on an outer circumference of the guide shaft 26 in a side direction. The install screw holes 46g and 46h are provided at the horizontal parts 46b and 46c.

The first pressing parts 46d and 46e are formed at positions where the first pressing parts 46d and 46e face the plane surfaces 26b of the notch parts 26a provided at both ends of the guide shaft 26. Head end parts of the first pressing parts 46d and 46e are bent downward when coming in touch with the plane surface 26b and press upward. The second pressing parts 46f press the outer circumference of the guide shaft 26 to position deciding parts 39 through 41 so that the guide shaft 26 can be supported against the base part 22 at the designated install position.

The plate spring 46 is formed with the first pressing parts 46d and 46e and the second pressing parts 46f in a body. Therefore, the number of components can be reduced and the guide shaft 26 can be pressed in the above mentioned two directions by one member. Hence, it is possible to improve the assembly efficiency.

Figure 7:
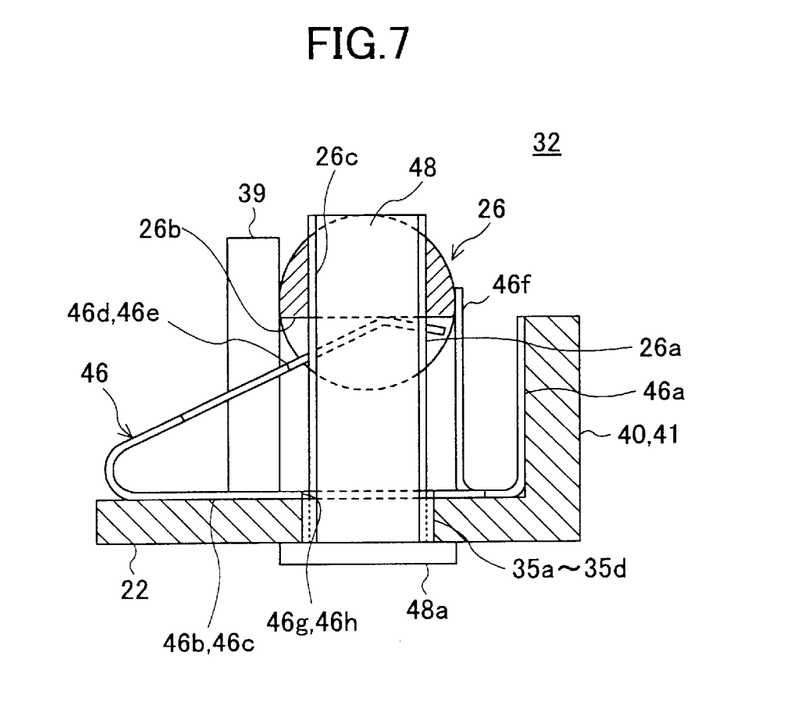
FIG. 7 is a vertical section of an install structure of the first embodiment of an adjustment mechanism 32 for the guide shaft 26.

Here, the adjustment mechanism 32 for adjusting the height and the inclination of the guide shaft 26 will be described.

FIG. 7 is a vertical section of an install structure of the first embodiment of an adjustment mechanism 32 for the guide shaft 26.

Referring to FIG. 7, the adjustment mechanism 32 has an adjustment screw 48 and the first pressing parts 46d and 46e of the plate spring 46. The adjustment screw 48 is screwed in an end part of the guide shaft 26. The first pressing parts 46d and 46e of the plate spring 46 each press an end part of the guide shaft 26.

The outer circumference of the guide shaft 26 is put between the position deciding part 39 and the second pressing parts 46f. The adjustment screws 48 are screwed into the install screw holes 46g and 46h of the guide shaft 26, piercing the plane surface 26b of both end parts of the guide shaft 26 from the lower side. The guide shaft 26 can be moved upward and downward based the screwing of the adjustment screws 48. A connecting hole not shown and having a rectangular or hexagonal configuration is provided in the center of an end surface of the head part 48a of the adjustment screw 48. The adjustment screw 48 can be rotated by connecting a tool having a rectangular or hexagonal configuration to the connecting hole.

The first pressing parts 46d and 46e of the plate spring 46 press the plane surfaces 26b provided at both ends of the guide shaft 26 in a head end direction (upward) of the adjustment screw 48. Thus, when the adjustment screw 48 is rotated, the first pressing parts 46d and 46e are elastically deformed based on the rotation position of the adjustment screw 48 so that the inclination angles of the first pressing parts 46d and 46e are changed. As a result of this, the guide shaft 26 can be raised and lowered. That is, it is possible to adjust the height and the inclination of the guide shaft 26 against base part 22 to a designated position easily by only rotating the adjustment screws 48 so that the height of the optical head 5 can be adjusted.

Thus, the first pressing parts 46d and 46e of the plate spring 46 come in contact with the plane surfaces 26b due to the notch part 26a provided at both ends of the guide shaft 26. As a result of this, the guide shaft 26 is pressed upward. Therefore, it is possible to adjust the minimum height of the guide shaft 26 to a lower position. Hence, it is possible to meet the requirement of making the apparatus thin by shortening the height of the adjustment mechanism 32.

Furthermore, the adjustment screw 48 is screwed in the screw hole 26c piercing the plane surface 26b, and thereby the space where the adjustment mechanism 32 is provided can be made small and it is possible to meet the requirement of making the apparatus thin by making the projecting height of the adjustment screw 48 small.

As described above, the first pressing parts 46d and 46e of the plate spring 46 press the plane surfaces 26b provided at both ends of the guide shaft 26 in the head end direction (upward) of the adjustment screw 48. The second pressing parts 46f press the outer circumference of the guide shaft 26 to the position deciding parts 40 and 41 of the base part 22 so that the guide shaft 26 is supported at the designated install position of the base part 22. The plate spring 46 has a structure in which the first pressing parts 46d and 46e and the second pressing parts 46f are formed in a body, so that it is possible to improve the assembly efficiency.

Figure 8:
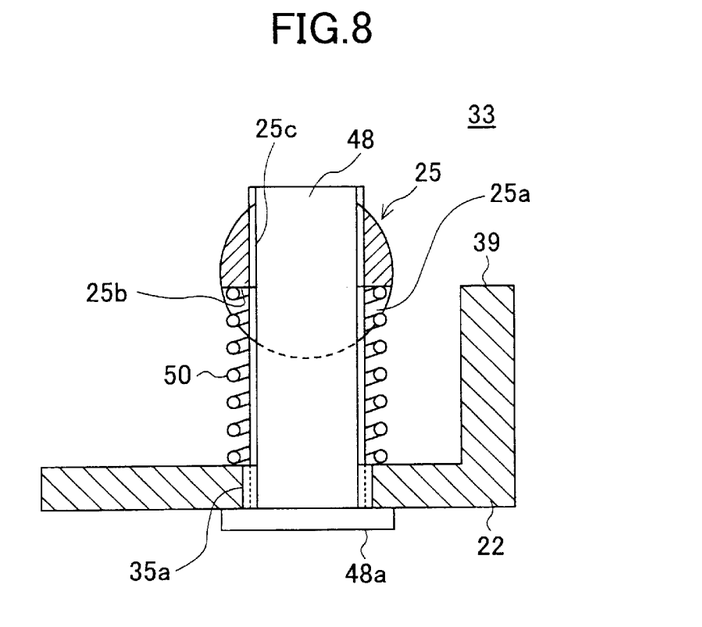
FIG. 8 is a vertical section of an install structure of the first embodiment of an adjustment mechanism 33 for the guide shaft 25.

Next, the adjustment mechanism 33 for adjusting the height and the inclination of the guide shaft 25 will be described.

The guide shaft 25 has two ends. One end of the guide shaft 25 is supported at a position in the vicinity of the turn table 6 and is adjustable by the adjustment mechanism 33. The other end of the guide shaft 25 is fixed to the base part 22 by the install screw 31. The guide shaft 25 is fixed by inserting the install screw 31 in the guide shaft 25 and screwing the install screw 31 into the small hole 35b of the base part 22. Hence, it is not necessary to provide a pressing member for the fixed end of the guide shaft 25. Accordingly, the other end of the guide shaft 25 may have a structure in which the notch part 25a is not provided.

FIG. 8 is a vertical section of an install structure of an adjustment mechanism 33 for the guide shaft 25.

Referring to FIG. 8, the adjustment mechanism 33 includes the adjustment screw 48 and a coil spring 50 as a pressing member. The adjustment screw 48 is screwed in the end part of the guide shaft 25. The end part of the guide shaft 25 is pressed by the coil spring 50.

One end of the guide shaft 25 is screwed into the screw hole 25c where the adjustment screw 48 is inserted from a lower part into the small hole 35a of the base part 22 so that the plane surface 25b is pierced. The guide shaft 25 is pressed upward by the coil spring 50 wound around the outer circumference of the adjustment screw 48. The coil spring 50 is provided between the plane surface 25b provided at one end of the guide shaft 25 and the base part 22 so as to press the plane surface 25b upward. Hence, it is possible to raise and lower the one end of the guide shaft 25 by expanding and contracting the coil spring 50 based on screwing the adjustment screw 48. Thus, it is possible to adjust the height and the inclination of the guide shaft 25 against base part 22 so that the height of the optical head 5 can be adjusted.

Furthermore, the adjustment screw 48 is screwed into the screw hole 25b piercing the plane surface 25b and thereby the space where the adjustment mechanism 33 is provided can be made small and meet the requirement of making the apparatus thin by making the projecting height of the adjustment screw 48 small.

Figure 9:
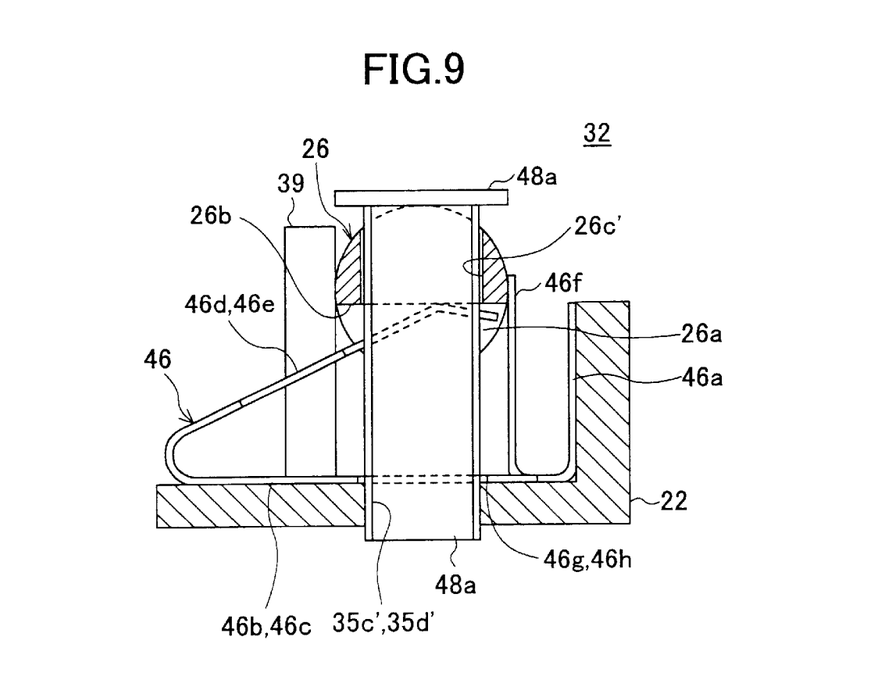
FIG. 9 is a vertical section of an install structure of the second embodiment of the adjustment mechanism 32.

FIG. 9 is a vertical section of an install structure of the second embodiment of the adjustment mechanism 32.

Referring to FIG. 9, the guide shaft 26 has a piercing hole 26c' piercing the plane surface 26b of both ends in upward and downward directions. The base part 22 has screw holes 35c' and 35d' where the adjustment screw 48 is screwed in. In the second embodiment, pressing forces of the first pressing parts 46d and 46e act in a remote direction from the base part 22, namely toward the head part 48a of the adjustment screw 48.

In the second embodiment, after the adjustment screws 48 are inserted in the piercing holes 26c' from above the guide shaft 26, the adjustment screws 48 are screwed in the screw holes 35c' and 35d'. Therefore, when the adjustment screws 48 are screwed in the screw holes 35c' and 35d' in a state where the head part 48a comes in contact with the outer circumference of the guide shaft 26, the first pressing parts 46d and 46e are elastically deformed based on a rotation position of the adjustment screw 48, so that the guide shaft 26 can be raised and lowered. That is, it is possible to adjust the height and an inclination of the guide shaft 26 against base part 22 to a designated position so that the height of the optical head 5 is adjusted.

In the second embodiment, as well as we the first embodiment, the first pressing parts 46d and 46e of the plate spring 46 come in contact with the plane surfaces 26b due to the notch parts 26a provided at both ends of the guide shaft 26. As a result of this, the guide shaft 26 is pressed upward. Therefore, it is possible to adjust the minimum height of the guide shaft 26 to a lower position. Hence, it is possible to meet the requirement of making the apparatus thin by shortening the height of the adjustment mechanism 32.

Furthermore, in the second embodiment, the adjustment screws 48 are screwed into the screw holes 26c' piercing the plane surfaces 26b, and thereby the space where the adjustment mechanism 32 is provided can be made small and meet the requirement of making the apparatus thin by making the projecting height of the adjustment screw 48 small.

Figure 10:
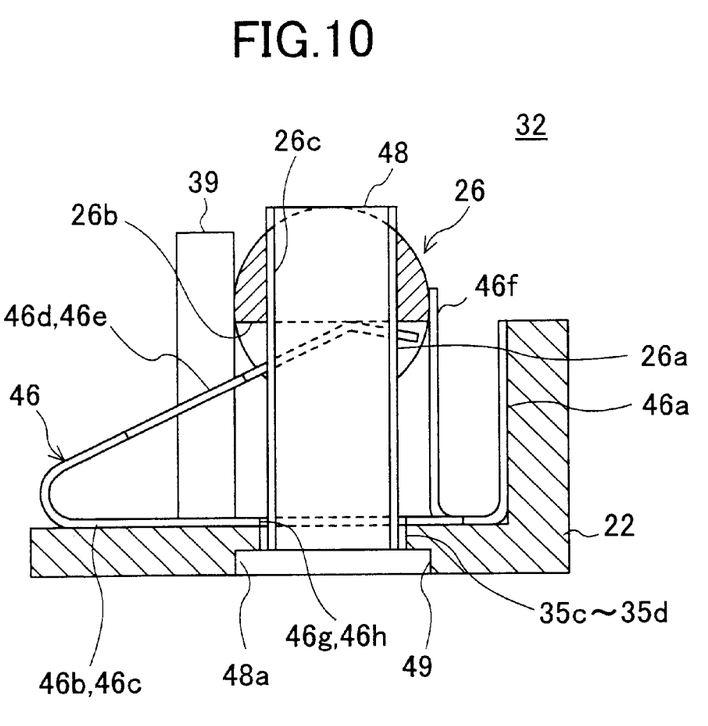
FIG. 10 is a vertical section of an install structure of the third embodiment of the adjustment mechanism 33.

FIG. 10 is a vertical section of an install structure of the third embodiment of the adjustment mechanism 32 of the present invention.

Referring to FIG. 10, a concave part 49 for connecting to the head part 48a of the adjustment screw 48 is provided on the bottom surface of the base part 22. Hence, the adjustment screw 48 is installed with the head part 48a being inserted in the concave part 49 and not projecting.

Therefore, in the adjustment mechanism 32, the head part 48a of the adjustment screw 48 is buried in the bottom surface of the base part 22 so as to make the apparatus thin.

Furthermore, in the third embodiment, as well as the first embodiment, the first pressing parts 46d and 46e of the plate spring 46 come in contact with the plane surfaces 26b due to the notch parts 26a provided at both ends of the guide shaft 26. As a result of this, the guide shaft 26 is pressed upwardly. Therefore, it is possible to adjust the minimum height of the guide shaft 26 to a lower position. Hence, it is possible to meet the requirement of making the apparatus thin by shortening the height of the adjustment mechanism 32.

In addition, in the third embodiment, the adjustment screw 48 is screwed into the screw hole 26c piercing the plane surface 26b, and thereby the space where the adjustment mechanism 32 is provided can be made small and it is possible to meet the requirement of making the apparatus thin by making the projecting height of the adjustment screw 48 small.

The present invention is not limited to these embodiments, but various variations and modifications may be made without departing from the scope of the present invention. For example, although the CD-ROM apparatus having an optical head is described as the disk apparatus in the above described embodiments, the present invention not limited to this but can be applied to a DVD apparatus or a record and read apparatus having a magnetic recording medium in which information is recorded and read by the magnetic head, for example.

This patent application is based on Japanese priority patent applications No. 2001-175798 filed on Jun. 11, 2001 and No. 2001-175799 filed on Jun. 11, 2001, the entire contents of which are hereby incorporated by reference.

What is claimed is:

1. A record and read apparatus, comprising:
a head by which information is read from or written to a recording medium;
a guide shaft guiding movements of the head;
a base part supporting the guide shaft; and
an adjustment mechanism adjusting an end part of the guide shaft so that the end part of the guide shaft has a designated height from the base part,
wherein the adjusting mechanism includes:
a screw hole part piercing the guide shaft in a direction perpendicular to the axis of the guide shaft;
a hole part formed at the base part;
an adjustment screw adjusting the height of the end part of the guide shaft by being inserted into the hole part of the base part and being screwed into the screw hole part piercing the guide shaft; and
a messing member pressing the guide shaft in a direction remote from the base part
wherein the pressing member is a plate spring formed in a body comprising by a first pressing part pressing the guide shaft in the direction remote from the base part and
a second pressing part pressing an outer circumference of the guide shaft so that the guide shaft is supported at a designated position against the base part.

2. The record and read apparatus as claimed in claim 1, wherein a concave part is formed in a vicinity of the hole part of the base part so that a bead part of the adjustment screw is inserted.

3. A record and read apparatus, comprising:
a head by which information is read from or written to a recording medium;
a guide shaft guiding movements of the head;
a base part supporting the guide shaft;
a pressing member pressing the guide shaft; and
a support member adjustably supporting an end part of the guide shaft against a pressing force of the pressing member so that the end part of the guide shaft has a designated height from the base part,
wherein the guide shaft has a notch part and the pressing member comes in contact with the notch part so that the height of the guide shaft from the base part is adjustable;
wherein the pressing member is a plate spring formed in a body comprising by a first pressing part pressing the guide shaft in the direction remote from the base part and
a second pressing part pressing an outer circumference of the guide shaft so that the guide shaft is supported at a designated position against the base part.

4. A record and read apparatus, comprising:
a head by which information is read from or written to a recording medium;
a guide shaft guiding movements of the head;
a base part supporting the guide shaft; and
an adjustment mechanism adjusting an end part of the guide shaft so that the end part of the guide shaft has a designated height from the base part,
wherein the adjusting mechanism includes:
a hole part piercing the guide shaft in a direction perpendicular to an axis of the guide shaft;
a screw hole part formed at the base part;
an adjustment screw adjusting the height of the end part of the guide shaft by being inserted into the hole part piercing the guide shaft and being screwed into the screw hole part of the base part; and
a pressing member pressing the guide shaft to a head part of the adjustment screw;
wherein the pressing member is a plate spring formed in a body comprising by a first pressing part pressing the guide shaft in the direction remote from the base part and
a second pressing part pressing an outer circumference of the guide shaft so that the guide shaft is supported at a designated position against the base part.

* * * * *